May 13, 1941. G. ROÉS 2,241,525
BACKPEDALING BRAKE DEVICE
Filed Dec. 6, 1938 2 Sheets-Sheet 1
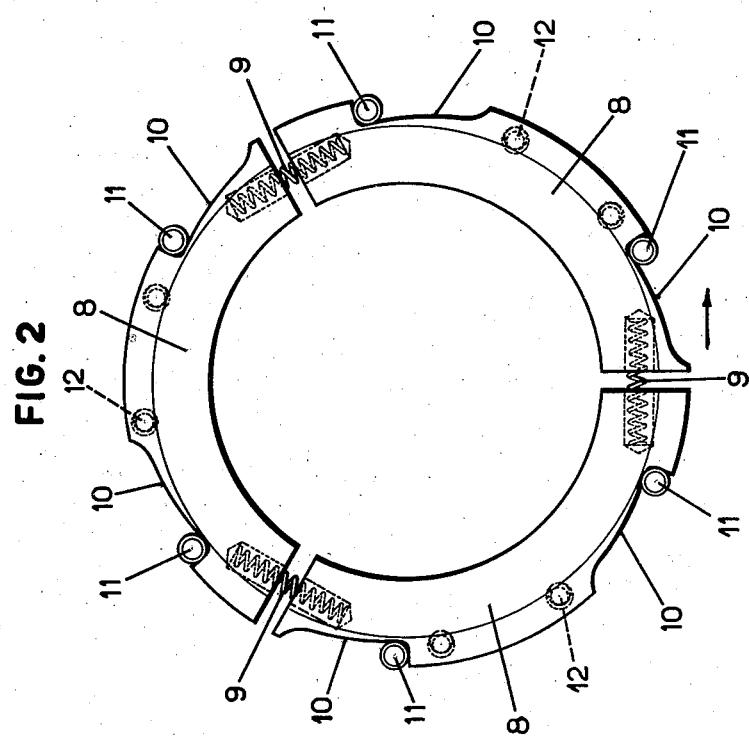
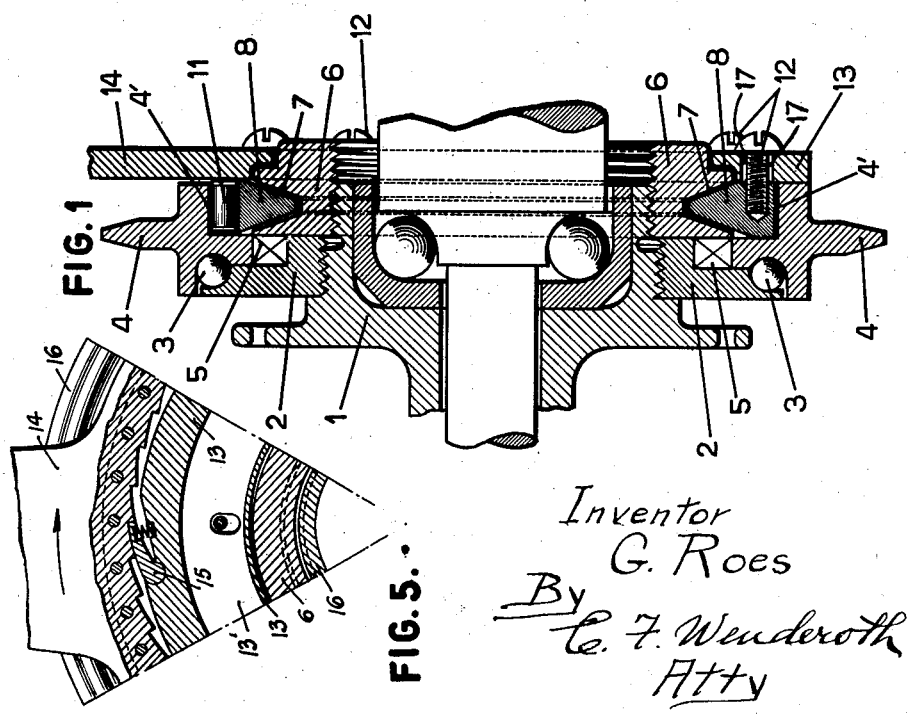
Inventor
G. Roes
By
C. F. Wenderoth
Atty May 13, 1941.                G. ROÉS                    2,241,525
                    BACKPEDALING BRAKE DEVICE
                    Filed Dec. 6, 1938            2 Sheets-Sheet 2

Inventor
G. Roes
By C. F. Wenderoth
Atty

Patented May 13, 1941

2,241,525

UNITED STATES PATENT OFFICE 2,241,525

BACKPEDALING BRAKE DEVICE

Georges Roés, Paris, France, assignor to Robert Frenkel, Paris, France

Application December 6, 1938, Serial No. 244,299
In France December 10, 1937

7 Claims. (Cl. 192—6)

Numerous backpedaling brake systems already exist, in particular in bicycles. All the present known devices are of rather complicated and delicate construction, so that their cost of manufacture is fairly high.

The object of the present invention is a novel backpedaling brake device which is applicable in particular, but not exclusively, to bicycles, and does not have the above-referred to drawbacks inasmuch as it is of simple and rugged construction, reliable and powerful in operation and low in cost.

The novel device is essentially characterized by the combination, on the one hand of a plurality of braking segments which are normally spaced apart from each other and of which the part turned towards the axis of the bicycle hub is of cuneiform cross-section or is toothed whereas the opposite part is provided with recesses in the shape of slopes which are adapted to co-operate with sliding or rolling members such as rollers, and on the other hand of a ring located internally relatively to the aforesaid braking segments and secured to the hub of the bicycle, which ring has, facing the braking segments, an annular groove of cuneiform cross-section identical with the cross-section of the braking segments (or has teeth corresponding to those of said segments) which are locked against rotation by any appropriate means.

In another form of construction the ring solid of the arm fixed on the rear fork of the bicycle comprises a hard free wheel of which the movable part prevents the rotation of the braking segments in order that the rear wheel of the bicycle may turn back when said bicycle is pushed backwards. On the other hand, the ring located internally relatively to the aforesaid braking segments (ring secured to the hub of the bicycle) can bear an outer disc (made for example of red copper) thus permitting the dissipation of the heat generated by braking.

In the accompanying drawings, two embodiments of the backpedaling brake device which is the object of the present invention have been shown diagrammatically and by way of non-limitative examples.

In said drawings:

Fig. 1 is a transversal section of the novel device;

Fig. 2 is a front view of the braking segments arranged in a ring and of the members which are associated therewith;

Fig. 5 is a partial sectional view illustrating the relationship of certain details.

Figure 4:
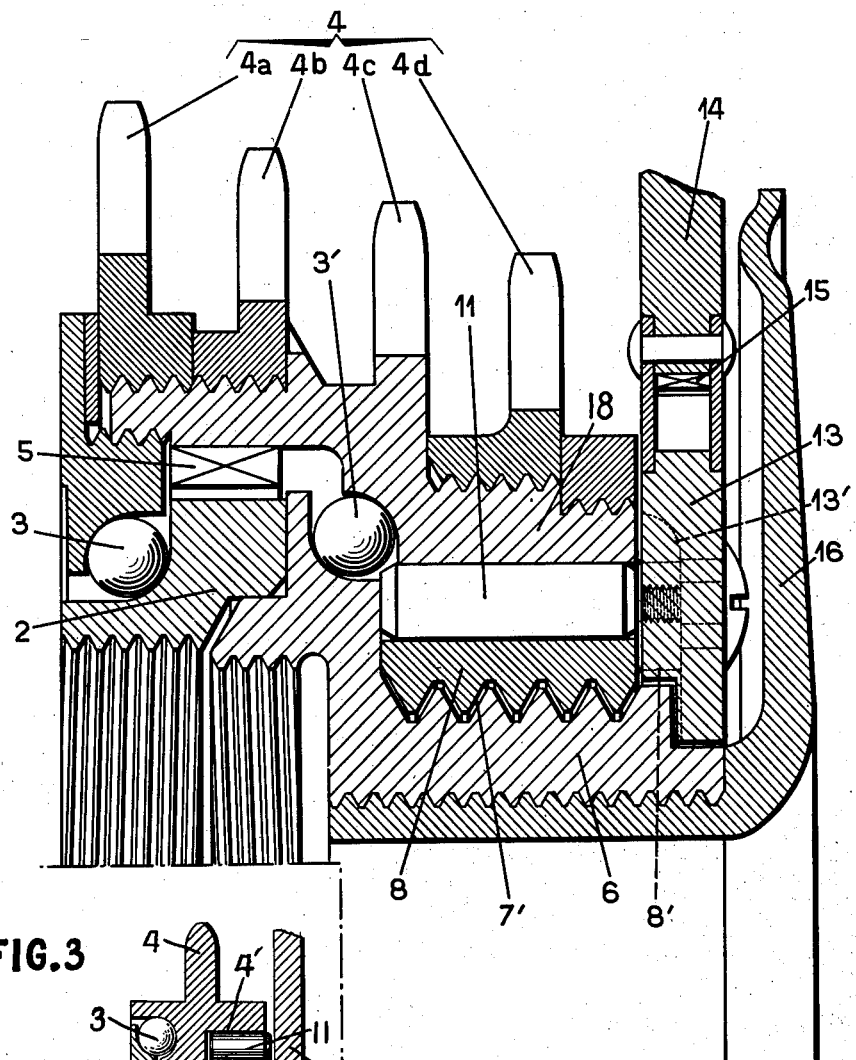
Fig. 4 represents diagrammatically and on a large scale, a partial section of another form of construction of the device in combination with the plurality of pinions of a change speed gear of another type.

In the accompanying drawings, Figs. 1 and 2, 1 designates a bicycle rear wheel hub mounted on the rear fork through the intermediary of the usual ball bearings, on which hub is screwed a plate 2 which carries with the interposition of a ball bearing 3, the driving pinion 4 which, in the direction of normal operation, drives the plate 2 through the instrumentality of any appropriate free wheel system 5 (having pawls, claws, balls, etc.).

Against the plate 2 is pressed a ring 6 which is likewise screwed on the hub 1 but in the opposite direction to the plate 2.

Figure 3:
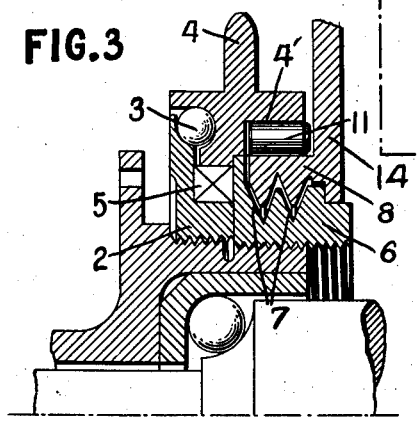
Fig. 3 is a modification of one part of the device shown in Fig. 1.

According to the invention, in the ring 6 is provided an annular groove 7 (or a plurality of grooves as shown in Fig. 3) of cuneiform cross-section in which penetrates a number of segments 8 of cuneiform cross-section (or toothed segments as shown in Fig. 3) corresponding to that of the groove 7. The various segments 8 (which may be of any number) are normally spaced apart from each other under the action of springs 9 engaged in housings at the end of the segments in question which carry on their periphery recesses forming slopes 10 on which rollers 11 are adapted to move. The locking against rotation of the segments 8 which (in the normal spaced position) are not in contact with the groove 7 of the ring 6 but touch the inner cylindrical surface 4' of the pinion 4, is obtained by means of screws 12 sliding freely in recesses 17 (elongated in the radial direction) provided on a ring 13 which is secured to an arm 14, the free end of which is locked on the fork of the bicycle.

It will immediately be seen that when the pinion 4 rotates in the direction corresponding to the forward travel of the bicycle, the hub 1 is driven by the pinion 4 responsive to the free wheel 5, the various segments 8 remaining spaced apart from each other under the action of the springs 9 and the rollers 11 remaining in the deepest part of their respective recesses only touch the inner surface 4' of the pinion 4.

When, on the contrary, the user performs a backpedaling movement, the pinion 4 causes the rollers 11 to mount the slopes 10, thereby causing the segments 8 to move closer together (towards the axis of the hub), and consequently causing these cuneiform segments to be forced into the corresponding cuneiform groove 7 of the ring 6 which is secured to the hub. As the segments are locked against rotation, they brake the ring 6 and consequently the hub 1 which is secured thereto.

On Fig. 4 which shows another form of realization is likewise designed by 2, a plate screwed with right pitch on the hub of the rear wheel (not shown); said plate carries with the interposition of a ball bearing 3, the group 4 of driving pinions 4a, 4b, 4c, 4d of a change speed gear in the direction of normal operation the said pinions drive the plate through the medium of a free wheel system 5 (pawls, claws, balls, etc.).

Against the plate 2 is pressed a ring 6 which is likewise screwed on the hub (not shown) but in the opposite direction to the plate 2.

On the ring 6 is provided a plurality of annular grooves 7' in which penetrate corresponding cuneiform ribs provided on the braking segments 8. As in the embodiment illustrated in Figures 1 and 2, a plurality of segments 8 (which may be of any number and which are normally spaced from each other under the action of springs) carry on their periphery recesses forming slopes on which rollers can move being in engagement with the internal cylindrical surface of the group 4 of pinions. The locking against rotation of the segments 8, which in the normal spaced position are not in engagement with the grooves 7' of the ring 6, is obtained by means of projections 8' penetrating in corresponding radially elongated recesses 13' provided in a ring 13 connected through the medium of a hard free wheel 15 to an arm 14, the free end of which is locked on the fork of the bicycle, the orientation of the constitutive elements of the free wheel 15 being such that it is possible to push the bicycle backwards in spite of the backpedaling brake.

During forward motion of the wheel, the rollers 11 abut against the stops at the lowest part of the slopes 10 of segments 8 (as illustrated in Fig. 2). When, however, the bicycle is backpedaled, the ring base 18, on which pinions 4a, b, c and d are mounted, performs a backward rotation, and the rollers 11 which are in frictional engagement with the said ring base 18 (as shown in Fig. 4) are thereby caused to move upwardly on the slopes 10 and thereby press the segments 8 into the ring 6, which causes the desired braking effect.

The ring 6 is rendered solid with the outer disc 16 made in red copper for example (or any other matter giving the same result) whereby a satisfactory dissipation is assured for the heat generated by the braking produced by the friction of segments 8 on the ring 6 which likewise is provided with a ball bearing 3' co-operating with the ball bearing 3 for supporting the group 4 of driving pinions.

It is to be noted that the ring 13 connected to the arm 14 by a hard free wheel 15 does not operate in the normal forward direction of the bicycle. Said ring remains still if another braking by backpedaling is produced. On the contrary when the user begins to pedal backwardly from a standstill position of the bicycle, the rollers 11 are moved upwardly on slopes 10 to press segments 8 into engagement with ring 6 after the manner of the braking operation previously described; but since the wheel is not rotating forwardly (arrow Fig. 5) as in the case of a braking operation, the backpedaling action causes the engagement of the segments 8 with ring 6 to effect a backward drive on the wheel, the same being permitted by the free-wheel elements 15.

It is obvious that the exemplary embodiments described above and illustrated in the accompanying drawings are only given by way of an indication which is in no way limitative and that the novel brake device may be subjected to any modification of detail without departing from the spirit of the invention.

The ring mentioned in 1 is combined with an outer disc made in red copper for example (or any other matters which would give the same result), and is adapted to dissipate the heat generated by the braking caused by the friction of braking segments (blocked against rotation) with the ring solid of the hub.

The ring which keeps in rotation the braking segments is connected by the instrumentality of a hard free wheel to the lever secured on the fork of the bicycle, the orientation of the free wheel elements being such that the ring in question can turn backwards with the hub when bicycle is pushed backwards.

Similarly, the braking device which is the object of the invention, is not only applicable to ordinary free wheels for bicycles, but may also be combined with progressive change speed gear systems or be applied to other mechanisms.

What I claim is:

1. A backpedaling brake device for bicycles or like vehicles, comprising in combination, a ring secured to the wheel hub, an annular groove of cuneiform cross-section in said ring, a plurality of segments arranged about the periphery of said ring, the cross-section of said segments at the end thereof facing the axis of the hub being of the same cuneiform shape as that of said groove, said segments having recesses at the opposite end which form slopes, displaceable members adapted to co-operate with said slopes, resilient means interposed between the ends of said segments for normally holding same spaced apart, means for locking said segments against rotation relatively to the hub, and means made operative by backpedaling for moving said displaceable members along said slopes.

2. A backpedaling brake for bicycles or like vehicles, comprising in combination a ring secured to the wheel hub, annular grooves of cuneiform cross-section in said ring, the cross-section of said segments at the end thereof facing the axis of the hub being of the same shape as that of said grooves, said segments having recesses at their opposite end which form slopes, rollers adapted to co-operate with said slopes, resilient means interposed between the outer ends of said segments for normally holding same spaced apart, an arm secured to the vehicle frame, a ring secured to the free end of said arm, said ring having radially elongated recesses therein, a pin secured to each of said segments and adapted to slide in said radially elongated recesses, whereby said segments are locked against rotation relatively to the hub, and means, made operative by backpedaling, for moving said rollers along said slopes.

3. In a free wheel system, a backpedaling brake comprising in combination a ring secured to the wheel hub, an annular toothed groove in said ring, a plurality of segments arranged about the periphery of said ring, the cross-section of said segments at the end thereof facing the axis of the hub being of the same shape as that of said groove, said segments having recesses at their opposite end which form slopes, displaceable members adapted to co-operate with said slopes, resilient means interposed between the outer ends of said segments for normally holding same spaced apart, means for locking said segments against rotation relatively to the hub, and a cylindrical portion of the driving pinion of the free wheel, the inner surface of said cylindrical portion being adapted to co-operate with said displaceable members for moving same along said slopes.

4. In a backpedaling brake device for bicycles as claimed in 1, means for dissipating the heat generated by braking.

5. In a backpedaling brake device for bicycles as claimed in 1, means associated with the ring secured to the wheel hub for dissipating the heat generated by braking.

6. In a backpedaling brake device for bicycles as claimed in 1, a ring secured to the wheel hub and solid with an outer surface adapted to dissipate the heat generated by braking.

7. A backpedaling brake device for bicycles or like vehicles, comprising in combination a ring secured to the wheel hub, annular grooves of cuneiform cross-section in said ring, the cross-section of said segments at the end thereof facing the axis of the hub being of the same shape as that of said grooves, said segments having recesses at their opposite end which form slopes, rollers adapted to co-operate with said slopes, resilient means interposed between the outer ends of said segments for normally holding same spaced apart, an arm secured to the vehicle frame, a ring secured to said arm, said ring comprising a hard free wheel, the movable part of which is adapted to prevent the rotation of said segments whereby the rear wheel of the bicycle may turn back when the bicycle is pushed backwards and means made operative by backpedaling for moving said rollers along said slopes.

GEORGES ROÉS.